2,970,375
HAND OPERATED METAL CUTTING DEVICE

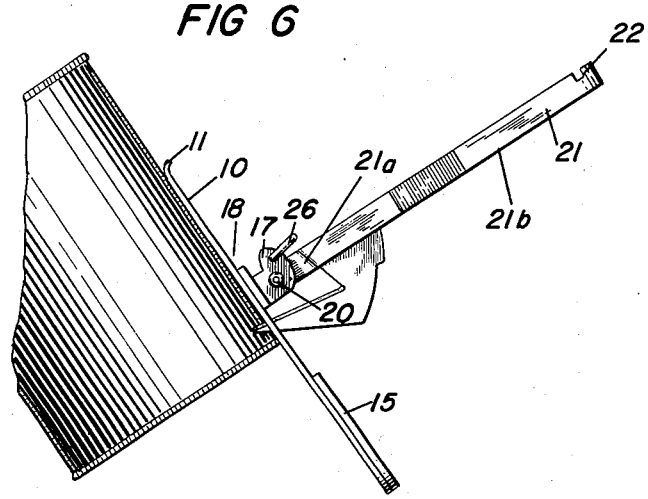
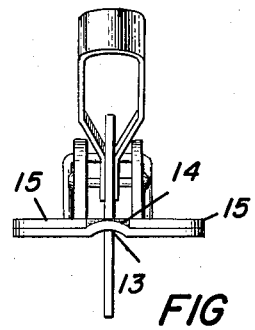
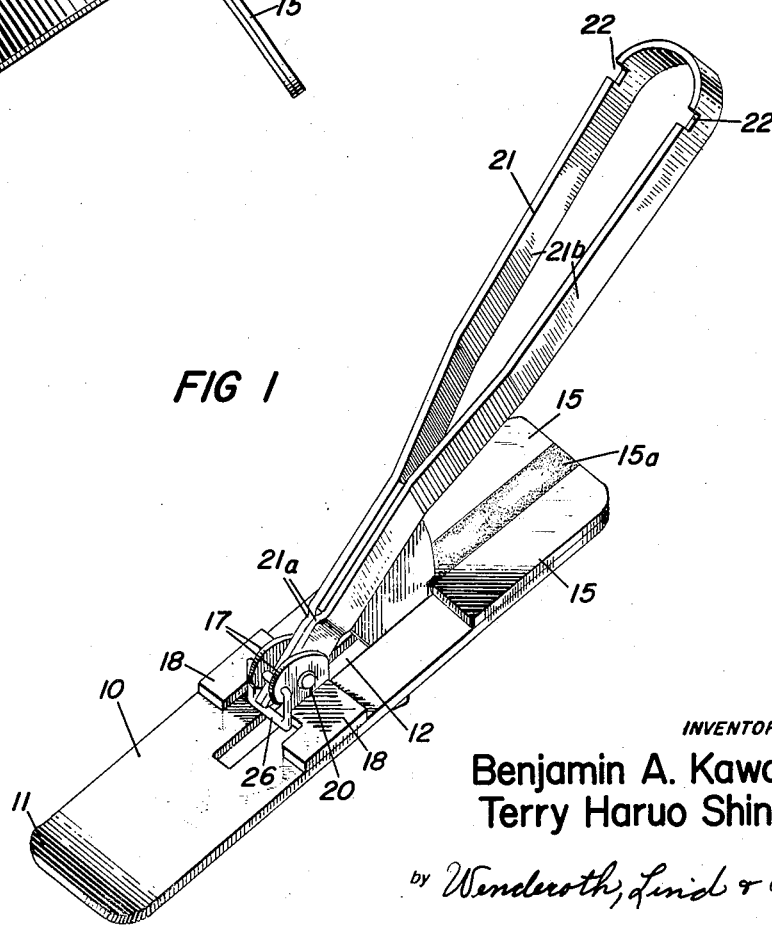
INVENTORS
Benjamin A. Kawahara
Terry Haruo Shinkawa
ATTORNEYS Feb. 7, 1961   B. A. KAWAHARA ET AL   2,970,375
HAND OPERATED METAL CUTTING DEVICE
Filed May 31, 1960   2 Sheets-Sheet 2
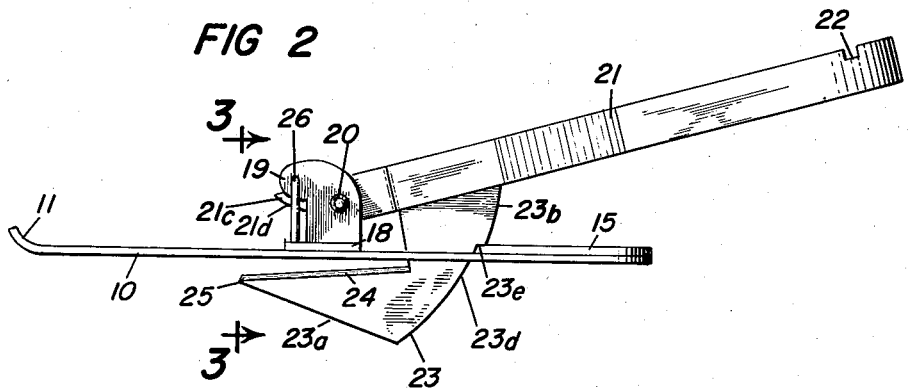
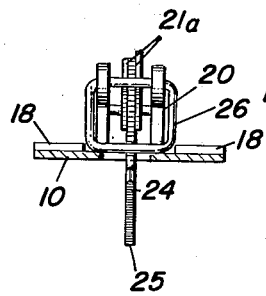
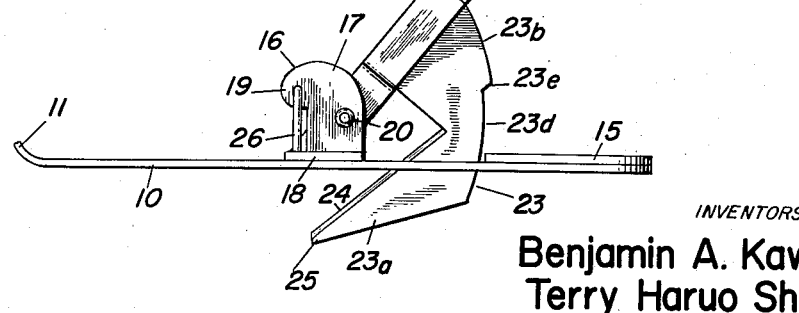
INVENTORS
Benjamin A. Kawahara
Terry Haruo Shinkawa
ATTORNEYS

Benjamin A. Kawahara, P.O. Box 859, and Terry Haruo Shinkawa, 1171 Alewa Drive, both of Honolulu, Hawaii Filed May 31, 1960, Ser. No. 32,682

3 Claims. (Cl. 30—23)

The present invention relates to a metal cutting device, and more particularly to a hand operated metal cutting device for cutting sheet metal such as is used in sheet metal containers.

The metal cutting device according to the present invention was particularly designed for cutting metal cans on which are filled with soil having a plant or plants therein by cutting the cylindrical wall of the can to permit removal of the soil without unduly disturbing the root system of the plant. However, it is applicable for the cutting of sheet metal generally.

The object of the invention is to provide a metal cutting device which is safe to use, in that there is little danger of the user cutting his hand on the jagged edges of the cut sheet metal.

It is a further object of the present invention to provide a metal cutting device which has means thereon to limit the extent of movement of the cutting blade so that it will not accidently be withdrawn from engagement with the sheet metal being cut during the cutting operation.

Other and further objects of the present invention will become apparent from the following specification and claims, taken together with the accompanying drawings, in which:

Fig. 1 is a perspective view of the metal cutting device according to the present invention;

Fig. 2 is a side elevation of the device of Fig. 1 with the handle and blade at the lowermost position;

Fig. 3 is a sectional view taken along line 3—3 of Fig. 2;

Fig. 4 is a rear elevation view of the device of Fig. 2;

Fig. 5 is a side elevation view similar to Fig. 2 with the handle and blade in the uppermost cutting position; and Fig. 6 is a side elevation view of the device in the position in which the blade is first forced through the sheet metal to be cut.

The metal cutting device according to the invention comprises an elongated plate 10 having an upturned front end 11. A longitudinally extending elongated blade aperture 12 is provided in the plate, and the bottom of the plate 10 has a downwardly opening groove 13 in the bottom surface thereof extending longitudinally along the plate 10 from the rear end of the blade aperture 12 to the rear end of the plate 10. In the embodiment as shown, this groove is formed by deforming the plate 10 upwardly as at 14, and providing reinforcing plates 15 on either side of the upwardly bulging portion of the plate on the top of the plate. The top of the bulge 14 is covered over with a covering weld 15a.

Mounted on the plate 10 adjacent the front end of the blade aperture 12 is a post 16, which is formed of two spaced opposed upright ears 17 secured to the base of flanges 18 from which the ears 17 project upwardly. Each ear 17 has thereon a forwardly extending overhang 19 which projects toward the front of the plate 10 from the upright portion of the ear. The ears 17 are spaced laterally of the plate 10 a distance substantially equal to the width of the blade aperture 12 so that they project upwardly from the side edges of the blade aperture 12.

Extending transversely of plate 10 through the ears 17 is a pivot pin 20, which may be held in position by riveting the ends thereof. Rotatably mounted on the pivot pin 20 is a handle 21, which in the present embodiment is comprised of a strip of metal bent in a loop, the ends 21a of the strip being parallel to and abutting each other where the pivot pin 20 passes through them, and the portions 21b of the strip being parallel spaced from each other along the length of the handle remote from the abutting ends. Adjacent the end remote from the pivot pin the portions 21b have a pair of opposed notches 22 in one edge thereof, the purpose of which will be explained hereinafter.

The end of the handle 21 adjacent the pivot pin 20 is beveled, as at 21d, and the bevel faces the blade aperture 12 and the pointed end 21c of the handle extends forwardly beyond the forwardly extending overhang 19 on the ears 17.

Mounted on the handle 21, and depending therefrom immediately to the rear of the post 16 is a cutting blade 23, which is generally L shaped, with the horizontal leg 23a of the L projecting toward the front of the plate 10. The downwardly extending leg 23b extends through the blade aperture 12, and has a curved rear edge 23d which is convex with respect to the blade itself. The curved rear edge 23d has a shoulder 23e along the length thereof which engages with the plate 10 at the rear end of the blade aperture 12 when the blade 23 and the handle 21 are in the lowest position, as shown in Fig. 2. Along the top edge of the horizontal leg 23a is a cutting edge 24, and the free end of the leg curves upwardly to the cutting edge 24 in a sharp point 25.

Pivotally suspended from the forwardly extending overhangs 19 on the ears 17 is a stop loop 26 which extends downwardly from one overhang, across the blade aperture 12 and upwardly to the other overhang. When this loop is in the down position, as shown in Figs. 1–5, it is engaged by the pointed end 21c of the handle 21 when the blade 23 and the handle 21 are at the uppermost position in which cutting action is to take place, i.e. at the point just before the lowermost end of curved rear edge 23d of the blade upwardly through the blade aperture 12.

In use, the stop loop 26 is first swung to the up position as shown in Fig. 6 and the plate 10 placed against the sheet metal to be cut. A can C is shown in Fig. 6. The handle 21 is then forced to rotate around the pivot pin 20 to force the point 25 of the blade 23 through the sheet metal. The handle is further rotated in the same direction until the shoulder 23e comes in contact with the plate 10 at the rear end of the blade aperture 12, at which point the handle cannot be rotated any further. The stop loop 26 is then swung to the down position, as shown in Figs. 1–5, and the handle is then pulled so as to rotate it in the opposite direction around pivot pin 21, until the pointed end 21c engages the stop loop 26. The handle is then rotated back and forth around the pivot pin 21 between the limits established by the abutment of the shoulder 23e against the plate 10 and the engagement of the pointed end 21c of the handle with the stop loop 26. At the same time a force is exerted on the handle in a direction toward the front of the plate 10. This urges the plate 10 along the surface of the sheet of metal being cut, while the action of the cutting edge of the blade 23 against the metal serves to cut it. The upturned front end 11 of the plate 10 serves to guide the plate over any irregularities in the surface or contour of the metal sheet. The jagged edges of the metal sheet will be passed over by the downwardly opening groove 13 in the bottom of the plate 10. The plate 10 will always be between the handle 21 and the jagged edges of the sheet of metal.

When cutting sheet metal containers which have a bead around the edge thereof, when the cutting device has cut through the sheet up to the bead, the device is removed from the sheet by swinging the stop loop 26 to the up position and reversing the operation by which the blade was originally inserted through the sheet. The bead is then engaged in the two notches 22 in the end of the handle and the handle twisted so as to break the bead.

It will thus be seen that the movement of the cutting blade is limited between a down and an up position, so that the hand of the user which is around the handle will not strike the plate 10 and at the same time is protected from the jagged edges of the cut metal sheet by the plate 10. Moreover, the blade cannot accidentally be pulled so far that it comes out of the sheet of metal. The pointed end 21c striking the stop loop 26 will stop the movement of the handle before this condition is reached. Thus the user can feel free to exert whatever force is necessary on the handle to cut the metal sheet without having to worry that the blade will come out of the sheet or that he will strike his hand against the plate or the jagged edges of the metal sheet being cut.

While the operation and use of the device has been described with particular reference to sheet metal containers, it will be obvious that the device has general utility in cutting metal sheets of substantially any type or shape which have a thickness which can be cut by the blade.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. A sheet metal cutting device comprising a plate having an upturned front end and having an elongated aperture therein extending in the direction of said plate from the front to the rear thereof, said plate having a downwardly opening groove in the bottom thereof extending rearwardly from the rear end of said elongated aperture to the rear of said plate, a post on the top of said plate, a handle pivoted to said post, a cutting blade on said handle extending through said elongated aperture, stop means on said post movably mounted thereon for movement into and out of a position in which it is engageable with said handle for limiting the movement of said handle in the direction in which said blade is moved upwardly through said aperture, and stop means on said blade engageable with said plate at the rear end of said aperture for limiting the movement of said handle and blade in the downward direction toward said plate.

2. A sheet metal cutting device comprising a plate having an upturned front end and having an elongated aperture therein extending in the direction of said plate from the front to the rear thereof, said plate having a downwardly opening groove in the bottom thereof extending rearwardly from the rear end of said elongated aperture to the rear of said plate, a pair of spaced opposed ears on opposite sides of said elongated aperture and projecting upwardly from said plate, said ears each having a forwardly extending overhang thereon, a pivot pin between said ears, a handle mounted on said pivot pin, a cutting blade on said handle extending through said elongated aperture, a stop loop pivotally mounted between said forwardly extending overhang on said ears, the end of said handle being engageable with said stop loop when the handle is in the position in which the blade is in the uppermost cutting position, and stop means on said blade engageable with said plate at the rear end of said aperture for limiting the movement of said handle and blade in the downward direction toward said plate.

3. A sheet metal cutting device comprising a plate having an upturned front end and having an elongated aperture therein extending in the direction of said plate from the front to the rear thereof, said plate having a downwardly opening groove in the bottom thereof extending rearwardly from the rear end of said elongated aperture to the rear of said plate, a pair of spaced opposed ears on opposite sides of said elongated aperture and projecting upwardly from said plate, said ears each having a forwardly extending overhang thereon, a pivot pin between said ears, a handle mounted on said pivot pin, a cutting blade on said handle extending through said elongated aperture, a stop loop pivotally mounted between said forwardly extending overhang on said ears, the end of said handle being engageable with said stop loop when the handle is in the position in which the blade is in the uppermost cutting position, the rear edge of said blade being curved and having a shoulder therein engageable with the plate at the rear end of said aperture for limiting the movement of said handle and blade in the downward direction toward said plate.

References Cited in the file of this patent

UNITED STATES PATENTS

| 144,051 | Barnes | Oct. 28, 1873 |
| 153,391 | Sprague | July 21, 1874 |
| 198,206 | McWilliams | Dec. 18, 1877 |
| 2,698,479 | Johnson | Jan. 4, 1955 |
| 2,882,599 | Martin | Apr. 21, 1959 |